US006986595B2

(12) United States Patent
Wünsch

(10) Patent No.: US 6,986,595 B2
(45) Date of Patent: Jan. 17, 2006

(54) PLUG-IN LIGHT

(75) Inventor: Eberhard Wünsch, Murrhardt (DE)

(73) Assignee: Witte & Sutor GmbH, Murrhardt (DE)

( * ) Notice: Subject to any disclaimer, the term of this patent is extended or adjusted under 35 U.S.C. 154(b) by 164 days.

(21) Appl. No.: 10/296,425

(22) PCT Filed: May 18, 2001

(86) PCT No.: PCT/DE01/01895

§ 371 (c)(1),
(2), (4) Date: May 19, 2003

(87) PCT Pub. No.: WO01/90634

PCT Pub. Date: Nov. 29, 2001

(65) Prior Publication Data

US 2004/0027825 A1 Feb. 12, 2004

(30) Foreign Application Priority Data

May 22, 2000 (DE) .............................. 100 25 000

(51) Int. Cl.
*F21V 33/00* (2006.01)

(52) U.S. Cl. ...................... 362/489; 362/226; 362/183; 362/253; 362/202

(58) Field of Classification Search ................ 362/202, 362/205, 206, 226, 488, 489, 800, 183, 253; 315/241 P, 29 R, 225, 224
See application file for complete search history.

(56) References Cited

U.S. PATENT DOCUMENTS

| 1,621,955 | A | | 3/1927 | Schiffner |
|---|---|---|---|---|
| 4,504,776 | A | * | 3/1985 | Haville ........................ 323/288 |
| 4,514,790 | A | * | 4/1985 | Will ............................ 362/183 |
| 4,972,172 | A | | 11/1990 | McLaughlin |
| 5,029,048 | A | * | 7/1991 | von Gaisberg et al. ...... 362/559 |
| 6,008,732 | A | * | 12/1999 | Lam ......................... 340/815.4 |
| 6,160,355 | A | * | 12/2000 | Yee .......................... 315/200 A |
| 6,366,028 | B1 | * | 4/2002 | Wener et al. ............. 315/241 P |
| 6,748,180 | B2 | * | 6/2004 | Feng ........................... 398/182 |

FOREIGN PATENT DOCUMENTS

| DE | 36 41 908 | 6/1988 |
|---|---|---|
| DE | 94 20 913 | 3/1995 |
| DE | 197 51 077 | 5/1998 |
| DE | 299 19 032 | 12/1999 |

* cited by examiner

*Primary Examiner*—Thomas M. Sember
(74) *Attorney, Agent, or Firm*—Collard & Roe, P.C.

(57) ABSTRACT

In motor vehicles the problem often arises that additional lighting is required in the cabin, in places where a voltage supply and the mounting thereof in the cockpit can not satisfactorily be resolved. A plug-in rechargeable lamp (1) has thus been developed, which may be plugged into the 12V or 24V cigarette lighter socket with a light diode (13) as light source, which gives a multi-application light source which may be used anywhere. The use of a light diode renders the lamp insensitive to shock effects and contributes to the lifespan thereof. The threshold voltage of the light diode (13) is optimally matched to the final discharge voltage of the applied accumulator cells, such that a fill discharge of the accumulators is practically excluded.

15 Claims, 3 Drawing Sheets

PLUG-IN LIGHT

CROSS REFERENCE TO RELATED APPLICATIONS

Applicants claim priority under 35 U.S.C. §119 of Application No. 100 25 000.9 filed on 22 May, 2000. Applicants also claim priority under 35 U.S.C. §365 of PCT/DE01/01895 filed on 18 May 2001. The international application under PCT article 21(2) was not published in English.

The invention relates to a plug in light, in particular a light for the interior of a motor vehicle, for connection to a connection socket, preferably a 12 V or 24 V low-voltage mains, with a lighting means and an accumulator for supplying the plug-in light with voltage independently of the mains, whereby a light-emitting diode is employed as the lighting means.

Such a plug-in light for automotive application is known from DE 197 51 077 A1. However this known light is an illuminated display that is plugged into the socket for the cigarette lighter of the vehicle. Now, the special feature of this illuminated display consists in that provision is made between different modes of operation, a mode with high light intensity and a mode with low light intensity. As soon as the illuminated display is pulled out of the cigarette lighter socket, reversal to the mode with the higher light intensity taken place by means of the corresponding semiconductor circuit. The display can then be used as an emergency signal.

The different operating modes are expected to minimize the load on the battery of the vehicle caused when current is supplied to the illuminated display. The diode circuit reverses between the energy supply from the battery of the vehicle and by the battery for the emergency light. Furthermore, the diode circuit protects the installed battery of the vehicle against being discharged at the time the vehicle is started. However, no provision is made for any corresponding protective circuit for the battery of the emergency light.

Especially in the area of the automobile, the problem has always been that the passenger cabin has to be as unlit as possible particularly during night time driving in order to permit the driver to read the instruments without interference and to watch the traffic situation. Switching the lighting of the passenger cabin to dark is desirable also so that traffic signs, signal lights and in particular the lights of other vehicles can be seen and reacted to as quickly as possible.

On the other hand, there is a constant need on part of the passengers to spend the driving time with as much comfort as possible. However, a basic lighting of the passenger cell is absolutely essential for any type of activity. This is assured in most cases by correspondingly weak light sources.

However, considerably more intensive light sources are required, for example so a glance at a road map is possible, or even for reading. For this purpose, so-called plug-in lamps are available in the accessory trade that can be connected, for example to a cigarette lighter, and which in most cases develop a relatively highly focused light so as to exclude detraction of the driver or other blinding effects.

The drawback of such plug-in lamps is that they have to be connected to the cigarette lighter in most cases and for that reason are not available in the location where the light source is needed. For this purpose, such plug-in lights have in most cases a so-called flexible hose with which the lights is adjusted and can be positioned within certain limits. As a rule, such flexible hoses have a length of about 20 cm, so that the individual lights are somewhat bulky and are perceived as annoying within the passenger cabin.

Finally, such lights have been found to be susceptible to trouble so some degree because during driving, unavoidable shocks and other stresses that are considerable to some extent very often lead to damages of the lighting means contained in such plug-in lamps, so that in most cases, the accessory that is perceived as complicated and susceptible to trouble, is discarded as a whole after it has failed the second or third time.

Therefore, the invention is based on the problem of providing a plug-in light that avoids the described drawbacks of the prior art, on the one hand, and offers a high-intensity light, blinding-free lighting as well as an overall increased operating comfort on the other.

The solution to this problem is made possible with a plug-in light in connection with which a light-emitting diode is used as the light source, whereby the current storage battery and the light-emitting diode are tuned to each other in such a way that the threshold voltage of the light-emitting diode is higher than or equal to the final discharge voltage of the current storage battery used.

Owing to the fact that a light-emitting diode is employed as the light source, the otherwise possible damage to the light source due to destruction of the filament coil caused by shocks is excluded because light-emitting diodes contain a different semiconductor material that develops the desired illumination effect when the threshold voltage is exceeded. Any damage to the light-emitting diode caused by shocks, as it is conceivable in connection with incandescent lamps, is therefore impossible if only on purely technically grounds.

Another advantage of the plug-in light as defined by the invention lies in the fact that it is provided with an accumulator for operating it independently of the current mains. The accumulator used in this connection is optimally matched to light-emitting used in that the threshold voltage of the light-emitting diode is elected to be greater than or equal to the final discharge voltage of the accumulator. The consequence of adhering to this condition results is that an effective low discharge protection is provided for the accumulator employed. Selecting the threshold voltage of the light-emitting diode accordingly assures that any further loading of the accumulator is avoided when the voltage falls short of the threshold voltage.

In this way, the discharge current of the accumulator is for that purpose substantially reduced to the measure of the self-discharge of the accumulator. Owing to the fact that the threshold voltage is optimally slightly above the minimally required final discharge voltage of the accumulator, any gate discharge is technically impossible for the accumulator.

An extremely long useful life of the plug-in light as defined by the invention is achieved in this way not only with respect to the light source but also in view of the accumulator. This permits the plug-in light as defined by the invention to be used independently of the current main and consequently without any restrictions otherwise.

Advantageous embodiments of the invention entail according to the features of the dependent claims.

The coordination between the light-emitting diode used with the specific threshold voltage $U_s$, and the accumulator employed with the specific final discharge voltage $U_o$ can be facilitated further by using a multi-cell accumulator. By cleverly selecting the cell number "z" with respect to the threshold voltage $U_s$ of the light-emitting diode, the discharge protection can be assured for the accumulator in a comparatively simple manner.

According to a further developed advantageous embodiment, nickel-metal-hydride accumulators (NiMH accumulators) are employed in connection with the plug-in light as defined by the invention.

The plug-in light embodied in conjunction with a robust, substantially three-component housing that is substantially comprised of the cylindrical plug part provided for being received in the connection socket, a contact plate, and a light head projecting in the plugged-in condition beyond the connection socket, such a light head being connected with the aforementioned plug component via a ring flange. In this connection, the contact plate mounted around a front side of the plug component is designed to serve as the plus pole, and an electrically conducting contact spring arranged on at least one side of the plug component, or the metallic housing of the plug component is designed to serve as the minus pole.

According to a further developed advantageous embodiment, the plug-in light has a spring clip that may serve for securing the plug-in light in a suitable location. For example, the plug-in light, which is independent of any supply voltage, can be clipped to a garment, fastened on a sun blind or attached in any other suitable site in order to serve in this manner as a stationary lighting element.

In further development of the above embodiment, the spring clip itself may be designed to be electrically conducting, so that instead of using the above-described electrical contact spring, it may serve as the minus pole for providing the electrical contact in the connection socket provided therefor.

The face side of the plug component facing the connection socket is connected with a contact plate that in turn has a set-up bread concentrically protruding beyond the plug component. This widened cross-sectional area assures enhanced contacting of the plug-in light within the connection socket, on the one hand, and, furthermore, facilitates the light to be set up, for example on a table or some other support, on the other hand. Because of the cylindrical shape of the housing, this is perceived as being advantageous because it would always have to be feared otherwise that the plug-in lamp might roll away and thus might be lost. When the plug-in light is plugged into the cigarette light connector of as motor vehicle, the set-up bead locks into an elastic holding device located internally in the socket.

The stability or the fastening possibilities of the plug-in light may be increased further by integrating in the contact plate a magnetic plate that makes it possible to connected the plug-in light, for example with a piece of the sheet metal of the interior in such a manner that the plug-in light is attached in that location. In this way, the plug-in light can be used within the area of a motor vehicle or somewhere else as a light source that can be used in many different ways.

The light-emitting diode is advantageously concentrically arranged within the plug-in light in particular in the area of the plug component or in the area of the head of the light, whereby the head of the light has a light outlet opening that is preferably closed by a transparent material.

According to a further developed embodiment, a lens or a condenser are additionally arranged in light ray path of the light-emitting diode used as the light source. The generated light can be focused or scattered in this way depending on the type of lens used.

In an alternative embodiment, a reversing device preferably in the form of a curved light conductor may be associated with the plug-in light as well, whereby the head of the light at the same time has a lateral light outlet opening for deflecting the ray path of the light-emitting diode in this way within the plug-in light, and the light will then exit from the side wall of the plug-in light.

In connection with this embodiment, too, additional light effects can be obtained by using an attachment lend for focusing or scattering the light.

According to another advantageous development, if the light exits from the side, the light head can be used as a printable surface or with an additional light-emitting diode for indicating, for example the charging state of the accumulator. This is particularly valuable because this surface of the light head will then also be visible while the plug-in light is operating plugged into the connection socket.

Owing to the fact that the light head is connected with the ring flange by a screw thread and the lens is normally supported within the ring flange, and the condenser is secured in the light head, the spacing between the lens and the condenser can be adjusted by means of the screw thread. In this way, the focal point of the plug-in light can be adjusted and adapted to the given requirement by simply rotating the light head relative to the ring flange.

The housing of the plug-in light is manufactured by the conventional injection molding technique and produced from a temperature-resistant plastic that is capable of withstanding without problems the partly extreme temperature variations usually occurring especially in the motor vehicle area.

The invention is explained in greater detail in the following with the help of an exemplified embodiment shown in the drawing, in which.

Figure 1:
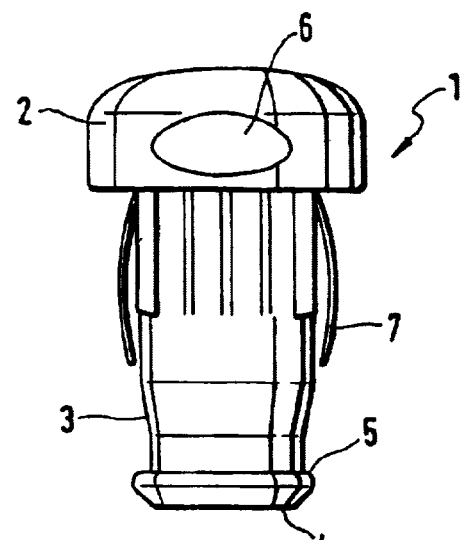
FIG. 1 shows a side view of a plug-in light.

The plug-in light 1 shown in FIG. 1 is substantially comprised of a light head 2 and a substantially cylindrical plug component 3 with a contact plate 4 on the face side.

The contact plate 4 represents the plus pole for the connection of the plug-in light 1.

The contact plate 4 is connected in this connection with a set-up bead 5 extending all around. This bead provides the plug-in light 1 with a larger set-up area and thus greater stability and, moreover, provides for safe contacting within the connection socket.

In a manner not shown in detail, said contact plate 4 has a recess on the face side for receiving a magnetic plate. This magnetic plate serves the purpose of attaching the plug-in light to metallic objects, if need be.

The light head 2 has a lateral light opening 6 for letting out the light beam of the light source arranged within the plug component 3 or the light head 2.

The minus pole of the plug-in light 1 is formed by the metallic contact spring elements 7 arranged on the side, or the metallic housing of the plug component 3. When the plug-in light is plugged into the connection socket, the contact spring elements 7 and/or the plug component 3 are pushed into a conducting connection with the inside wall of the socket forming the counter pole. The accumulators of the plug-in light 1, which are not shown in detail, are charged in this position.

Figure 2:
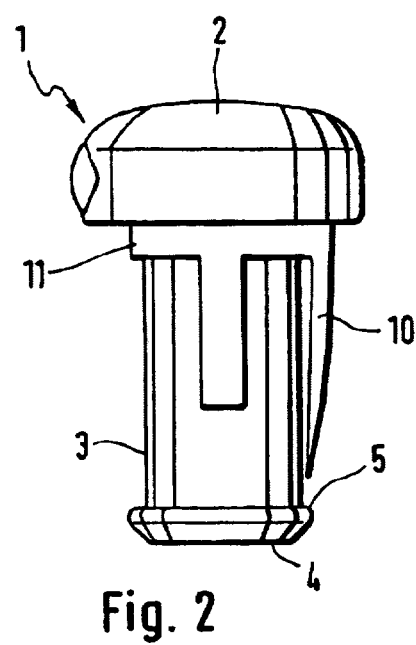
FIG. 2 shows another plug-in light by another side view.
Figure 3:
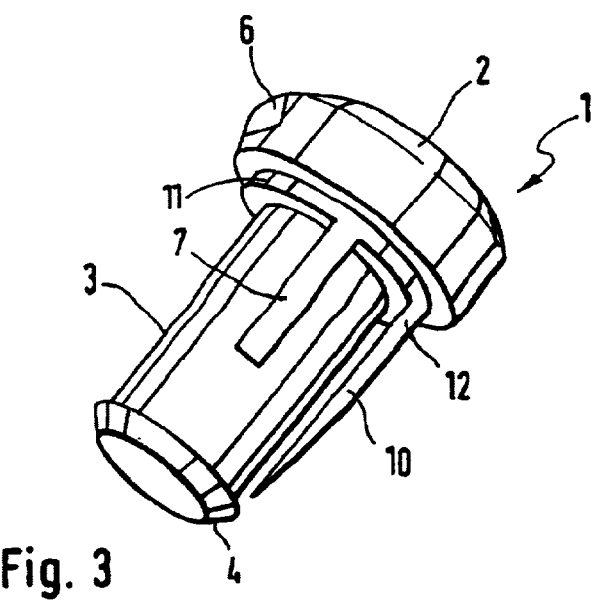
FIG. 3 shows the plug-in light according to FIG. 2 viewed inclined from the bottom.

FIG. 2 shows an alternative embodiment of a plug-in light 1. This is a plug-in light 1 with a light head 2 with a light outlet opening 6 on the side as well. The difference between this plug-in light and the plug-in light 1 shown in FIG. 1 is that the plug-in light 1 shown in FIG. 2 is equipped with a spring clip 10.

The spring clip 10 is placed against a ring flange 11 arranged between the light head 2 and the plug component 3. The ring flange 11 has a diameter that is enlarged versus the plug component 3 and, furthermore, is provided with an asymmetrical holding nose 12 for articulating the spring clip 10 with a spacing. In a manner not shown in detail, the spring clip 10 may be designed in this way in the form of a contact spring element 7 as well.

The two embodiments shown in FIGS. 1 and 2 both comprise the lateral light outlet openings 6, so that the surface of the face side of the light head 2 may serve as an imprintable surface or may be fitted with attachment elements such as indicating instruments.

Figure 4:
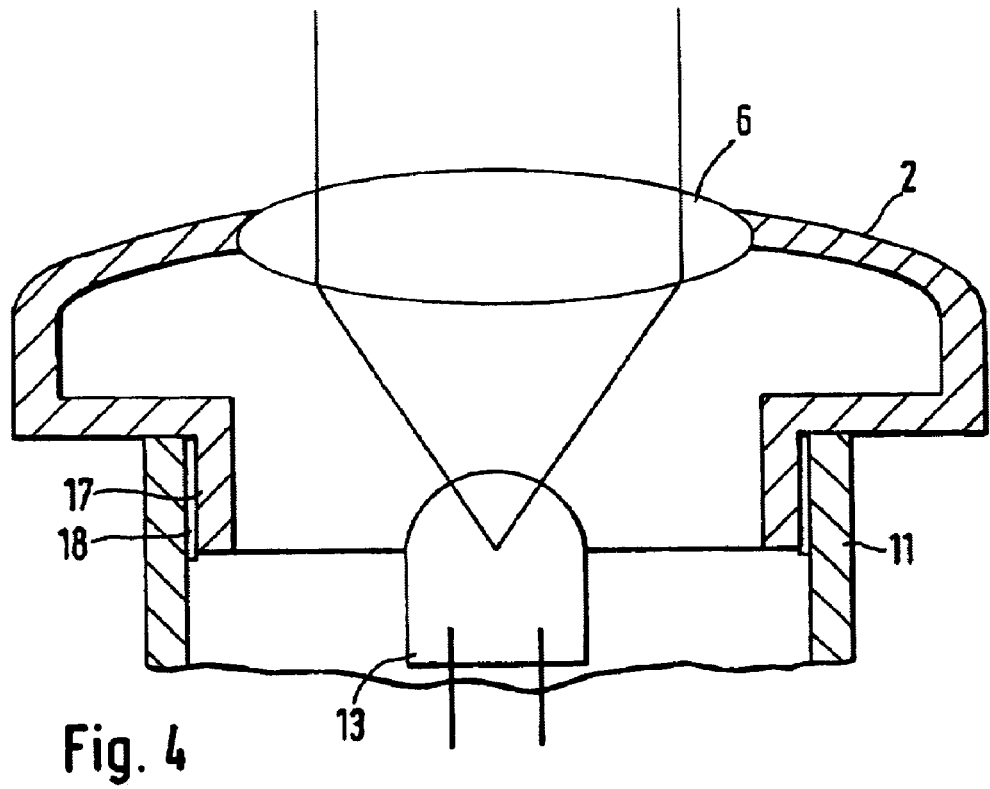
FIG. 4 shows a plug-in light with a light outlet in the axial direction, by a detailed view and sectional representation.

FIG. 4 by a detailed view and sectional representation a plug-in light 1 whose ray path is disposed substantially parallel with or in an imagined extension of the central cylinder axis of the plug-in light 1. A light-emitting diode (LED) 13 is arranged within the plug-in light 1, serving as the light source. In this connection, the light-emitting diode 13 may be arranged also within the area of the ring flange 11, but also within the area of the plug component 3.

In connection with an embodiment in the sense of FIG. 4, the light head 2 has a central light outlet opening 6 located within the area of the face-side surface of the light head 2. In the embodiment shown here, both the light-emitting diode 13 and the light outlet opening 6 are arranged centrally and concentrically with the symmetrical central axis of the cylindrical plug component 3.

The light outlet opening 6 is usually closed with a transparent surface. The light outlet opening 6, however, must not be closed in any case. According to a further developed embodiment, a lens 14 for focusing the radiation generated by means of the light-emitting diode 13 may be arranged in the ray path of the light-emitting diode 13.

Figure 5:
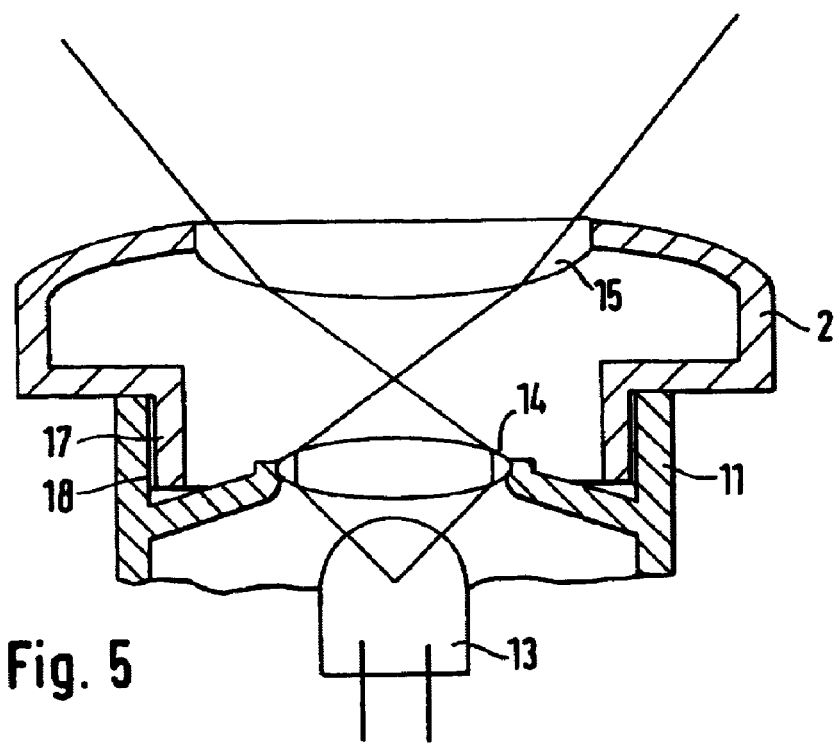
FIG. 5 shows another plug-in light with a light outlet in the axial direction, by a detailed view and sectional representation.

In the embodiment shown in FIG. 5, the lens 14 is secured by means of the ring flange 11. A condenser 15 is arranged downstream in the continuing ray path of the light-emitting diode. The condenser may be arranged in the area of the light outlet opening 6, so that a lens-and-condenser system is built up as an optical system of the plug-in light 1 for coupling the light out.

Figure 6:
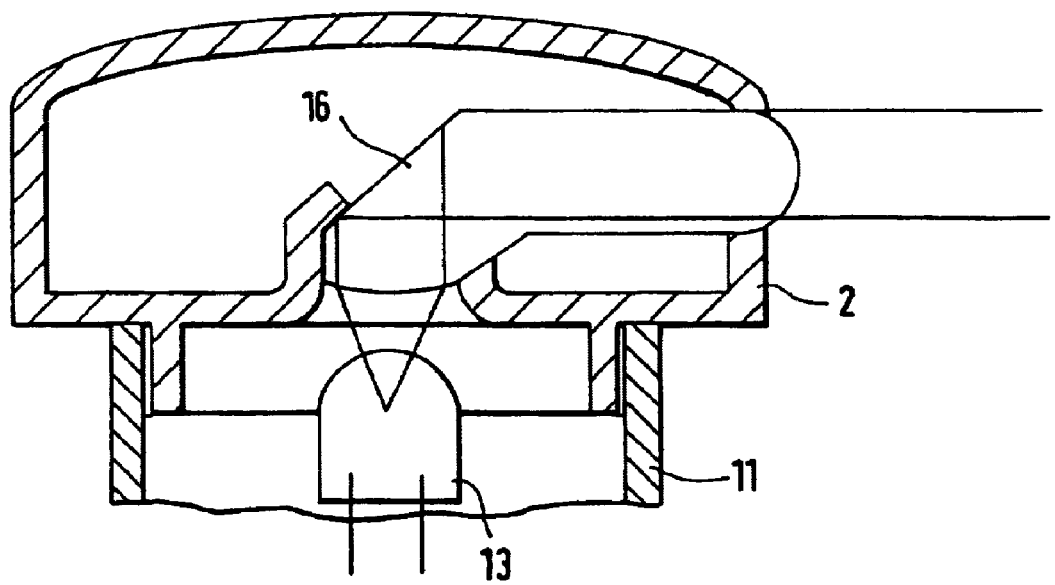
FIG. 6 shows a plug-in light with a light outlet transversely in relation to the axial direction, by a detailed view and sectional representation.
Figure 7:
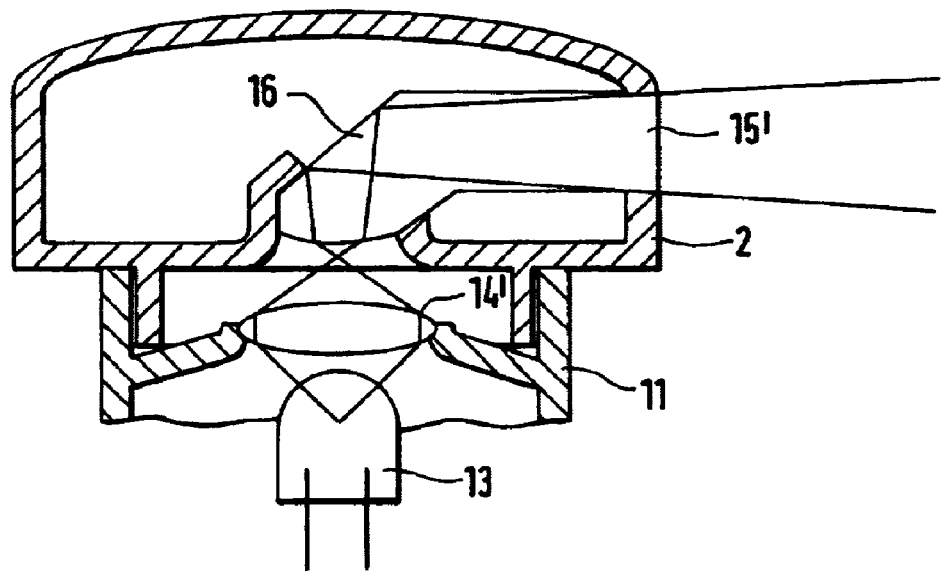
FIG. 7 shows another plug-in light with a light outlet transversely in relation to the axial direction, by a detailed view and sectional representation.

So as to permit the light to exit sideways in accordance with FIG. 6, the reversing device 16 for example in the form of a curved light conductor has to be arranged in the path of the rays of the light-emitting diode 13. In this connection, the light conductor may be designed at the same time as a lens, or an additional lens 14 may be arranged again in the area of the ring flange in the path of the rays downstream of the light-emitting diode 13 in accordance with FIG. 7. In this case, the light conductor is at the same time designed as a condenser. Instead of using the lens 15 it is possible also to arrange a normal prism in the path of the rays of the light-emitting diode 13.

In all embodiments according to FIGS. 4 to 7, the light head 2 is connected with the ring flange 11 via a suitable male thread 17, with the ring flange having a matching female thread.

Owing to the thread connection of the light head 2 with the ring flange 11 it is possible to adjust the spacing between the lenses 14, 14', which are secured within the ring flange, in relation to the condenser 15, 15', which is secured within the light head 2. The focal length or focal point of the plug-in light 1 is adjusted in this manner.

The plug-in light 1 is switched in and out by further rotating the light head 2 in relation to the plug component 3.

The function of the described plug-in light 1 is explained again in the following in a summarizing manner with the help of the exemplified embodiments described above:

The plug-in light 1 as defined by the invention serves for plugging into a 12 volt or 24 volt connection socket. In this connection, the plug-in light 1 can be switched on and out by rotating the light head 2 in relation to the plug component 3. So that the plug-in light 1 can be used independently of the location, it is provided with accumulators not shown in detail, which permit the plug-in light 1 to be supplied independently of the mains. The accumulators are usually charged within the connection socket. In an advantageously further developed embodiment, the plug-in light 1 may be provided with a spring clip 10 and/or a holding magnet so that the plug-in light 1 can be used not only in a mobile but also in a stationary manner. The plug-in light 1 may be designed either in the form of a front or a side light radiator. The design as a side light radiator permits using the light head 2 of the plug-in light 1 as an additional indicator or an advertising medium.

The focal point of the plug-in light 1 can be adapted to changing circumstances by simply rotating the light head 2 relative to the ring flange 11.

LIST OF REFERENCE SYMBOLS

1 Plug-in light
2 Light head
3 Plug component
4 Contact plate
5 Set-up bead
6 Light outlet opening
7 Contact spring elements
10 Spring clip
11 Ring flange
12 Holding nose
13 Light-emitting diode
14 Lens
15 Condenser
16 Reversing device
17 Male thread
18 Female thread
Us Threshold voltage
z Number of cells
Uo Final discharge voltage

What is claimed is:

1. A plug-in light comprising
(a) a plus pole and a minus pole for connection to a connection socket of a voltage supply;
(b) a light source comprising a light-emitting diode having a threshold voltage ($U_s$); and
(c) an accumulator comprising a number (z) of accumulator cells for supplying the light source with voltage, said accumulator cells having a final discharge voltage ($U_o$);
wherein the plus pole and the minus pole are connected to the voltage supply and said accumulator is charged when the plug-in light is plugged in the connection socket; and wherein the number (z) of cells; the final discharge voltage ($U_o$), and the threshold voltage ($U_s$) are selected so that in each case:

$$U_s > U_o * z.$$

2. The plug-in light according to claim 1, wherein the accumulator is a nickel-metal-hydride accumulator.

3. The plug-in light according to claim 1, wherein the ring flange has an enlarged cross section versus the cylindrical plug component with a holding nose, on which a spring clip is articulated so that said spring clip extends with its longitudinal expanse with a spacing, but otherwise substantially parallel with a wall section of the plug component from the ring flange in the direction of the contact plate.

4. The plug-in light according to claim 3, wherein the spring clip is designed in the form of an electrically conducting contact spring element.

5. The plug-in light according to claim 3, wherein the contact plate has a cross section enlarged versus the cross section of the plug component on account of the fact that provision is made on the outer circumference for a set-up bead concentrically projecting beyond the cross section of the plug component.

6. The plug-in light according to claim 5, wherein the contact plate is provided with a concentrically arranged recess for receiving a magnetic plate, said recess being disposed on the inside.

7. The plug-in light according to claim 1, wherein the light-emitting diode is arranged within the plug component or the ring flange or the light head; and in the path of the rays of said light-emitting diode, the light head has a light outlet opening closed with a transparent material.

8. The plug-in light according to claim 7, wherein the light outlet opening is arranged concentrically with the central cylinder axis of the plug-in light in a manner such that the light beam exits substantially in the direction of said imagined central cylinder axis.

9. The plug-in light according to claim 7, wherein a lens is concentrically supported in the path of the rays of the light-emitting diode (13) within the ring flange; and a condenser is concentrically arranged within the area of the light outlet opening of the light head.

10. The plug-in light according to claim 7, wherein a reversing device comprising a curved light conductor is arranged within an area of the light head; and the light outlet opening is arranged in an area of it's a cylindrical outer wall off said light head in a manner such that a light beam exits substantially perpendicular to a central cylinder axis of the plug-in light.

11. The plug-in light according to claim 1, wherein the plug component has a housing produced from a plastic with a temperature resistance in the range of at least $$-20°\ C. \leq t \leq 45°\ C.$$

12. A plug-in light for connection to a connection socket of a voltage supply comprising:
(a) a substantially cylindrical housing;
(b) a cylindrical plug component adapted to be received in a connection box, said plug component comprising a first side facing the connection socket and a second side;
(c) a contact plate terminating said plug component on said first side;
(d) a light head provided on said second side;
(e) a ring flange connecting said light head with said plug component;
(f) at least one contact spring element articulated on said ring flange so that in an intended condition, said at least one contact spring element rests electrically conducting against an inner wall of the connection socket;
(g) a light source comprising a light-emitting diode having a threshold voltage ($U_s$); and
(h) an accumulator comprising a number (z) of accumulator cells for supplying the light source with voltage, said accumulator cells having a final discharge voltage ($U_o$);
wherein the number (z) of cells, the final discharge voltage ($U_o$), and the threshold voltage ($U_s$) are selected so that in each case:

$$U_s > U_o * z.$$

13. A plug-in light for connection to a connection socket of a voltage supply comprising:
(a) a light source comprising a light-emitting diode having a threshold voltage ($U_s$) and a path of rays;
(b) a plug component;
(c) a light head provided on said plug component having a cylindrical outer wall with a central cylindrical axis and a light outlet opening arranged in an area of the cylindrical outer wall in the path of rays so that a light beam exits substantially perpendicular to the central cylindrical axis;
(d) a ring flange connecting said light head with said plug component, said light-emitting diode being arranged within the plug component, the ring flange, or the light head;
(e) a reversing device comprising a condenser or a device that radiates upon a condenser arranged in an area of the light outlet opening;
(f) a lens arranged in an area of the ring flange in the path of rays; and
(g) an accumulator comprising a number (z) of accumulator cells for supplying the light source with a voltage, said accumulator cells having a final discharge voltage ($U_o$);
wherein the number (z) of cells, the final discharge voltage ($U_o$), and the threshold voltage ($U_s$) are selected so that in each case:

$$U_s < U_o * z.$$

14. A plug-in light for connection to a connection socket of a voltage supply comprising:
(a) a light source comprising a light-emitting diode having a threshold voltage ($U_s$) and a path of rays;
(b) a plug component;
(c) a light head provided on said plug component having a cylindrical outer wall with a central cylindrical axis, a face-side surface designed as a closed, imprintable surface, and a light outlet opening arranged in an area of the cylindrical outer wall in the path of rays so that a light beam exits substantially perpendicular to the central cylindrical axis;
(d) a ring flange connecting said light head with said plug component, said light-emitting diode being arranged within the plug component, the ring flange, or the light head;
(e) a reversing device; and
(f) an accumulator comprising a number (z) of accumulator cells for supplying the light source with a voltage, said accumulator cells having a final discharge voltage ($U_o$);

wherein the number (z) of cells, the final discharge voltage ($U_o$), and the threshold voltage ($U_s$) are selected so that in each case:

$$U_s < U_o * z.$$

15. A plug-in light for connection to a connection socket of a voltage supply comprising:
    (a) a light source comprising a light-emitting diode having a threshold voltage ($U_s$) and a path of rays;
    (b) a plug component;
    (c) a light head provided on said plug component having a light outlet opening in the path of rays;
    (d) a ring flange rotatably connected via a thread with said light head, said ring flange connecting said light head with said plug component, said light head being rotatable relative to said ring flange, said light-emitting diode being arranged within the plug component, the ring flange, or the light head;
    (e) a lens supported by said ring flange;
    (f) a condenser supported by said light head, said condenser and said lens being separated W a spacing adjustable by rotation of said light head relative to said ring flange;
    (g) an accumulator comprising a number (z) of accumulator cells for supplying the light source with a voltage, said accumulator cells having a final discharge voltage ($U_o$);

wherein the number (z) of cells, the final discharge voltage ($U_o$), and the threshold voltage ($U_s$) are selected so that in each case:

$$U_s < U_o * z.$$

* * * * *

UNITED STATES PATENT AND TRADEMARK OFFICE
CERTIFICATE OF CORRECTION

PATENT NO. : 6,986,595 B2  Page 1 of 1
APPLICATION NO. : 10/296425
DATED : January 17, 2006
INVENTOR(S) : Wünsch It is certified that error appears in the above-identified patent and that said Letters Patent is hereby corrected as shown below:

Column 7, line 1, after "cells", please change ";" to: --,--.
Column 7, line 39 (Line 3 of Claim 9), after the word "diode", please delete: "13".
Column 7, line 45 (Line 4 of Claim 10), after the word "of", please delete: "it's".
Column 7, line 46 (Line 5 of Claim 10), please change "off" to: --of--.
Column 8, line 45 (Line 28 of Claim 13), please change "<" to: -->--.
Column 9, line 5, please change "<" to: -->--.
Column 10, line 3, after the word "separated", please change "W" to: --by--.
Column 10, line 13, please change "<" to: -->--.

Signed and Sealed this

Eighteenth Day of March, 2008

JON W. DUDAS
*Director of the United States Patent and Trademark Office*